United States Patent
Bhat et al.

(10) Patent No.: US 8,676,919 B2
(45) Date of Patent: Mar. 18, 2014

(54) ASYNCHRONOUSLY EDITING A SYNCHRONOUS DATA STORE, SUCH AS A PROJECT MANAGEMENT DATA STORE

(75) Inventors: Sudin Bhat, Redmond, WA (US); Raju Iyer, Redmond, WA (US); Daniel Michael, Seattle, WA (US); Mohammad Yakoob Shahdad, Bellevue, WA (US); Bonny Lau, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 12/146,516

(22) Filed: Jun. 26, 2008

(65) Prior Publication Data
US 2009/0327403 A1 Dec. 31, 2009

(51) Int. Cl.
*G06F 15/167* (2006.01)

(52) U.S. Cl.
USPC .......... 709/214; 709/203; 709/202; 709/205; 709/217

(58) Field of Classification Search
USPC .................... 709/214, 203, 202, 205, 217
See application file for complete search history.

(56) References Cited

U.S. PATENT DOCUMENTS

| | | | | |
|---|---|---|---|---|
| 5,212,792 A | * | 5/1993 | Gerety et al. | 717/100 |
| 5,734,898 A | * | 3/1998 | He | 1/1 |
| RE38,633 E | | 10/2004 | Srinivasan | |
| 2004/0083238 A1 | | 4/2004 | Louis et al. | |
| 2005/0229151 A1 | | 10/2005 | Gupta et al. | |
| 2006/0070019 A1 | | 3/2006 | Vishnumurty et al. | |
| 2006/0075332 A1 | * | 4/2006 | Fairweather et al. | 715/515 |
| 2006/0136441 A1 | | 6/2006 | Fujisaki | |
| 2007/0073695 A1 | | 3/2007 | Conlan et al. | |
| 2007/0150327 A1 | | 6/2007 | Dromgold | |
| 2007/0233534 A1 | | 10/2007 | Martin et al. | |
| 2008/0103871 A1 | * | 5/2008 | Ruehl et al. | 705/9 |
| 2008/0140490 A1 | * | 6/2008 | Wang et al. | 705/8 |

OTHER PUBLICATIONS

"Introduction to the PSI Web Services", Copyright: 2008, 3 pages. http://msdn2.microsoft.com/en-us/library/ms481506.aspx.
Liu, et al., "A Lightweight Project-Management Environment for Small Novice Teams", Date: May 3-11, 2003, 111 Pages. http://www.acse2003.cs.uvic.ca/acse-2003-procs.pdf#page=50.
"Project Management", Copyright: 2008, 1 Pages. http://www.unanet.com/products/projectManagement.html?source=WC1PM.
"Project Server Interface (PSI) Overview", Copyright: 2008, 1 Pages. http://msdn2.microsoft.com/en-us/library/ms457477.aspx.

* cited by examiner

*Primary Examiner* — Lan-Dai T Truong
(74) *Attorney, Agent, or Firm* — Tom Wong; Jim Ross; Micky Minhas

(57) ABSTRACT

A dynamic client system is described that provides an interactive client-side web application experience to a user accessing an application through a web browser. At the client, the system receives an edit to a project task from a user of the client. The system receives an indication that the user has completed editing the project task. The system sends the edited project task to the project server. The client sends edits to the project server in the background and users can continue editing the project without waiting for the project server to finish processing the edits.

20 Claims, 6 Drawing Sheets

ASYNCHRONOUSLY EDITING A SYNCHRONOUS DATA STORE, SUCH AS A PROJECT MANAGEMENT DATA STORE

BACKGROUND

In software engineering, a web application is an application that is accessed via a web browser over a network such as the Internet or an intranet. Web applications are popular due to the ubiquity of a client, sometimes called a thin client, such as a web browser. A significant advantage of building web applications to support standard browser features is that they can perform as specified regardless of the operating system (OS) or OS version installed on a given client. Rather than creating clients for Microsoft Windows, Mac OS X, GNU/Linux, and other operating systems, the application developer can write the application once and deploy it almost anywhere. The ability to update and maintain web applications without distributing and installing software on potentially thousands of client computers is one reason for their popularity. Common web applications include webmail, online retail sales, online auctions, wikis, discussion boards, weblogs, massively multiplayer online role-playing games (MMORPGs), and many others.

The web interface places very few limits on client functionality. Through Java, JavaScript, Dynamic HyperText Markup Language (DHTML), Adobe Flash, and other technologies, application-specific methods such as drawing on the screen, playing audio, and access to the keyboard and mouse are all possible. Many services have worked to combine all of these into a more familiar interface that adopts the appearance of an operating system. General-purpose techniques such as drag and drop are also supported by these technologies. Web developers often use client-side scripting to add functionality, especially to create an interactive experience that does not involve page reloading (which many users find disruptive). Recently, technologies have been developed to coordinate client-side scripting with server-side technologies such as PHP. Ajax, a web development technique using a combination of various technologies, is an example of a technology that creates a more interactive experience.

Though many variations are possible, a web application is commonly structured as a three-tiered application. In its most common form, a web browser is the first tier, an engine using some dynamic web content technology (such as ASP, ASP.NET, CGI, ColdFusion, JSP/Java, PHP, embPerl, Python, or Ruby on Rails) is the middle tier, and a database or application server is the third tier. The web browser sends requests to the middle tier, which services the request by making queries against the application server. The web server also generates a web-based user interface provided to the client.

An emerging strategy for application software companies is to provide web access to software previously distributed as local applications. Depending on the type of application, it may involve the development of an entirely different browser-based interface, or merely adapting an existing application to use different presentation technology. These programs allow the user to pay a monthly or yearly fee for use of a software application without having to install it on a local hard drive. A company that follows this strategy is known as an application service provider (ASP), and ASPs are currently receiving much attention in the software industry.

In earlier types of client-server computing, each application had its own client program that served as its user interface and was separately installed on each user's personal computer. An upgrade to the server part of the application would typically involve an upgrade to the clients installed on each user workstation, adding to the support cost and decreasing productivity. In contrast, web applications dynamically generate a series of web documents in a standard format, such as HyperText Markup Language (HTML)/eXtended HTML (XHTML), supported by common browsers. Client-side scripting in a standard language such as JavaScript is commonly included to add dynamic elements to the user interface. Generally, each individual web page is delivered to the client as a static document, but the sequence of pages can provide an interactive experience, as user input is returned through web form elements embedded in the page markup. During the session, the web browser interprets and displays the pages, and acts as the universal client for any web application.

As noted above, the user interface experience of web applications is typically one of loading a page, submitting form elements, and then loading a subsequent page. Unlike traditional local applications, because of the slowness imposed by the network roundtrip in between the client and server, web applications are often designed to transmit as little data as possible. While this creates a faster experience by reducing page loads, it also unfortunately generally reduces the interactivity of the application. Application developers may even choose not to offer certain features through the web that are available in a client version of the application. For example, Project Server 2007 offers users some capabilities for editing their project plans on the web, however, the editing experience is limited. Users can make a series of edits to tasks properties, after which they have to manually hit a button for the project to be validated and scheduled. The entire project then goes through a queue to be scheduled (which can be slow depending on the complexity of the project and the number of other activities in the queue waiting to be processed). The lack of immediate feedback after changing a task's properties means that users will not know if they have made invalid or contradictory edits that cause errors until they have scheduled the entire project.

SUMMARY

A dynamic client system is described that provides an interactive client-side web application experience to a user accessing an application through a web browser. At the client, the system receives an edit to a project task from a user of the client. The system receives an indication that the user has completed editing the project task. The system sends the edited project task to the project server. While waiting for a response from the project server, the system can receive other edits from the client. The client sends edits to the project server in the background and users can continue editing the project without waiting for the project server to finish processing the edits. Thus, the dynamic client system provides a more responsive UI that gives users faster feedback when they make edits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
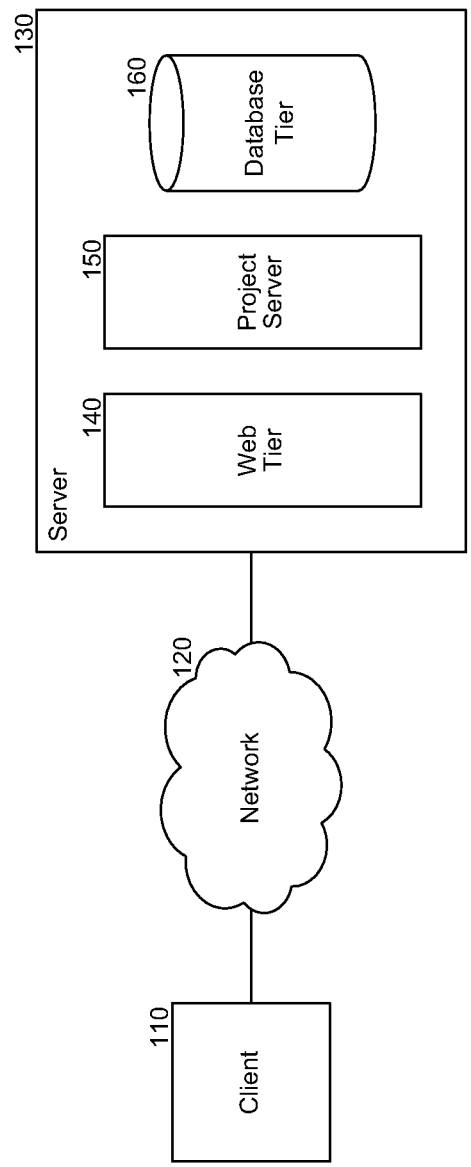
FIG. 1 is a block diagram that illustrates a typical operating environment of a dynamic client system, in one embodiment.

A dynamic client system is described that provides an interactive client-side web application experience to a user accessing an application through a web browser. At the client, the system receives an edit to a project task from a user of the client. For example, the user may adjust the end date or duration of the project task. The system receives an indication that the user has completed editing the project task. For example, when the user selects another project task or presses a save button, the system may treat that action as an indication that the user has completed editing the previously selected project task. The system sends the edit to the project task to the project server. For example, the system may post a web form submit to the project server. While waiting for a response from the project server, the system can receive other edits from the client. The client sends edits to the project server in the background and users can continue editing the project without waiting for the project server to finish processing the edits. Thus, the dynamic client system provides a more responsive UI that gives users faster feedback when they make edits, such as to tasks in a project plan.

Project managers may use project management software such as Microsoft Project to assist in managing their projects. A project manager may use project management software to track all information relating to a project such as tasks, duration of tasks, resources, and other considerations. When this project information is specified, the project management software may automatically provide project feedback, such as by adjusting completion time of a task based on adjustments to considerations, graphically displaying relationships between the project's tasks, and estimating completion dates and costs based on indicated progress. As an example, if a project comprises three tasks and the project ends at the completion of a task, the project may end sooner if the project manager assigns an additional resource to the task. Thus, the project manager is able to use the project management software to create, predict, analyze, and manage project schedules.

A project manager may provide as input to project management software a variety of information relevant to a project. This information may include work periods, tasks, resources, and progress. Work period information may include, e.g., workdays and work hours. Task information may include, e.g., names, durations, relationships to other tasks, and resources assigned to the tasks. Resource information may include, e.g., types, names, costs, and work hours. Progress information may include an initial project plan (sometimes referred to as a "baseline"), task completion, and actual values. Actual values describe previously completed portions of the project plan. Examples of actual values include, e.g., start date, finish date, duration, and cost. The project management software may use this information to determine an initial project schedule.

When the project manager provides additional input or adjusts one of the previously provided inputs, a scheduler component of the project management software may reschedule one or more tasks automatically. As an example, when a project has many tasks with multiple dependencies or constraints, a change to the expected duration of a task may cause the scheduler component to reschedule, e.g., the start or finish dates of other tasks, and potentially the overall project schedule.

FIG. 1 is a block diagram that illustrates a typical operating environment of the dynamic client system, in one embodiment. A client 110 communicates via a network 120 with a server 130. The client 110 can include a personal computer (PC) or other client system running a web browser or other application user interface. The network 120 can include the Internet, a private corporate network, or other suitable network for connecting the client 110 and server 130. The server 130 includes a web tier 140, project server 150, and database tier 160. The web tier 140 receives HyperText Transfer Protocol (HTTP) or other web-based requests and converts the requests to calls to the project server 150. The project server 150 handles the application semantics for managing, editing, and scheduling one or more projects. The web tier 160 provides persistent storage for project and other data. Although FIG. 1 illustrates a typical operating environment, those of ordinary skill in the art will recognize many variations that perform similar functions. For example, the web tier 140 and project server 150 may be implemented as a single component.

Figure 2:
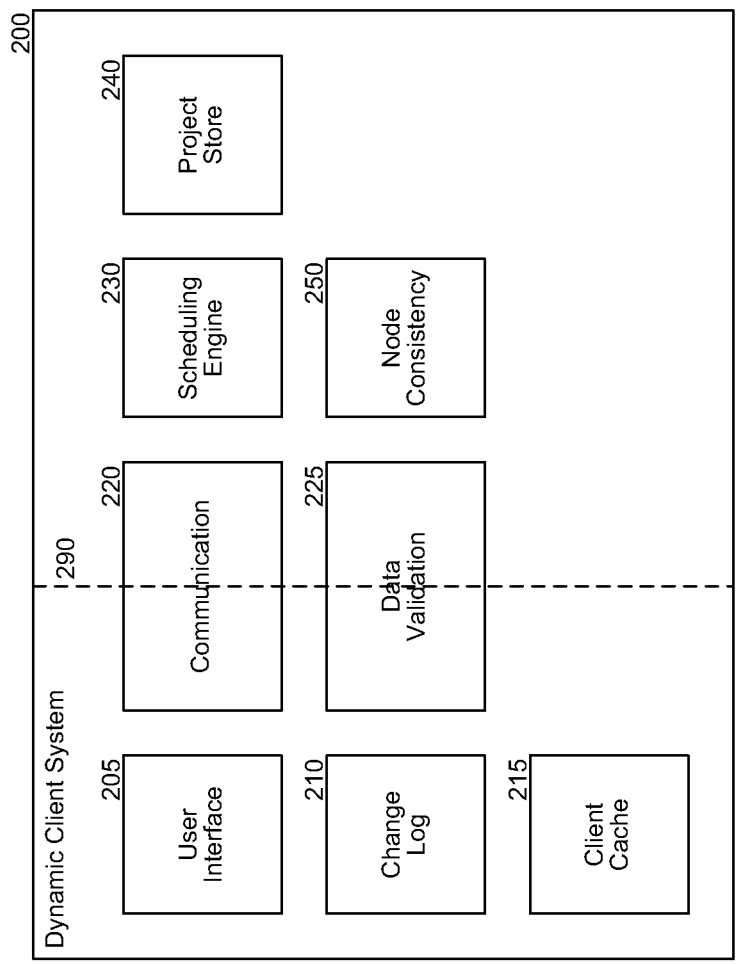
FIG. 2 is a block diagram that illustrates components of the dynamic client system, in one embodiment.

FIG. 2 is a block diagram that illustrates components of the dynamic client system, in one embodiment. The dynamic client system 200 includes a user interface component 205, a change log component 210, a client cache component 215, a communication component 220, a data validation component 225, a scheduling engine 230, a project store 240, and a node consistency component 250. Each of these components is described in further detail below. Components to the left of the line 290 are typically implemented on the client, and components to the right of the line 290 are typically implemented on the server, though other configurations may work well with the system 200. Those components that the line 290 passes through typically have portions on the client and the server. For example, the data validation component 225 may perform some data validation on the client before sending changes to the server, and the server may perform more extensive data validation on changes received from the client.

The user interface component 205 includes an asynchronous front-end UI that performs background processing while users interact with project data. This allows users to continually make edits without having to wait for the backend scheduler to complete its calculation. The user interface component 205 provides a display for interaction with the user. The user interface component 205 contains facilities for selecting and editing tasks. The component lists tasks that are part of the project and allows a user to select a particular task for which the user would like more information. The user interface component 205 may provide output of schedule information in a variety of formats. As examples, the output component may provide schedule information in a Gantt chart, report, or table, or by other common user interface paradigms.

The change log component 210 tracks a sequential list of changes made to a task by a user. The change log forms a client side queue of changes that are later sent to the server. When the user finishes editing a particular task, the communication component 220 gathers the list of changes in the change log and sends them to the server. When the server sends a response that indicates that changes have been incorporated into the project, the change log component 210 may clear the change log and only track those changes pending submission to the server.

The client cache component 215 stores a client-side cache of project data received from the server, and may include tasks, dependencies, and information to display when the project is displayed. The client cache component 215 is updated with new data from the server after the server responds to submitted user project edits.

The communication component 220 acts as a liaison between the front-end client and middle tier project server, and provides a lightweight editing experience. The communication component 220 hosts the logic for sending task level data over to the project server tier for maintaining consistency between properties within a task (for example, start date+ duration=finish date). The communication component 220 may use HyperText Transfer Protocol (HTTP) or other web-based protocols for communicating between the client and server.

The data validation component 225 performs some validation of data at the client, such as verifying that the user submits a valid type of data for a field being edited. The data validation component 225 also performs more extensive validation at the server, such as verifying that a task's properties are internally consistent (e.g., start date to end date matches duration). The data validation component 225 may attempt to perform those elements of validation that affect a single task at the client and perform inter-task validation at the server. This provides a much lighter weight experience—only tasks relevant to the latest user edits are calculated, instead of having to wait for the whole project to be rescheduled.

The scheduling engine component 230 determines a schedule for each task based on data received from the user. The scheduling engine component 230 also determines a schedule for tasks based on schedule considerations, such as constraints or dependencies relating to other tasks. Other scheduling considerations may include, e.g., task constraints, actual values that have been reported on a task, start or finish dates of the project or its tasks, status dates for the project or its tasks, dependencies on other projects, or dependencies on milestones or phases within the project or other projects. The scheduling engine component 230 may also determine a schedule for tasks based on operations performed by a user, such as when leveling resources. The user may level resources to, e.g., ensure that a resource is not assigned to more tasks than the resource is capable of completing. Scheduling is generally a resource intensive and time-consuming task, so the system 200 may avoid calculating the entire schedule until the user has finished editing the project or until a large number of edits have been made that warrant recalculation of the project.

The project store component 240 stores the tasks that make up the project and information associated with the tasks, such as the determinations made by the scheduling engine 230 about when the tasks are scheduled. The project store component 240 may contain many projects and multiple tasks associated with each project. The project store component 240 provides persistent storage for the projects and may provide other benefits, such as the consistency typically associated with a database and routine data backups. The project store and other components described herein may include one or multiple servers that perform the functions described. For example, it is common to balance the load of large tasks across multiple servers.

The full scheduling engine computes the project schedule in its entirety, considering inter-task dependencies in addition to maintaining intra-task data consistency. The node consistency component 250 is used by the scheduling engine 230 to maintain consistency between properties within a task. The node consistency component 250 manages task level data sent by the web application on the client. Separating the scheduling engine 230 and node consistency component 250 is one way to provide a lighter weight experience, such that users can get more immediate feedback at the intra-task level without having to fully scheduling the project.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
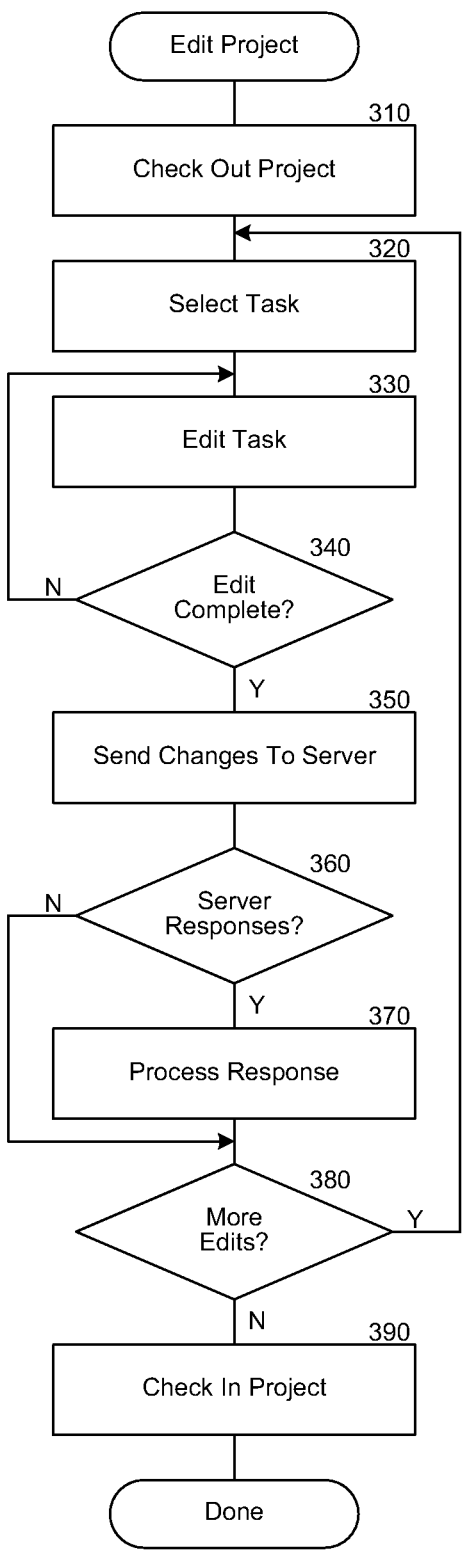
FIG. 3 is a flow diagram that illustrates the processing of the dynamic client system, in one embodiment.

FIG. 3 is a flow diagram that illustrates the processing of the dynamic client system, in one embodiment. These steps are invoked when a user opens a project for editing. In block 310, the system receives a request from the user to check out the project for editing. The system may request information from the server, such as the project's task-level data, and store the information in the web browser client cache. The client renders the task-level data in an interactive, AJAX-based UI. In block 320, the system receives a selection by the user of a project task to edit. Users can click on a specific task to edit in the UI. In block 330, the system receives edits to the selected task from the user. For example, the user may change the start date of the task. Each edit goes through some basic data type validation (i.e. user cannot enter text in numeric fields). Valid changes are stored in the client cache in a sequenced change log.

In decision block 340, if the user has completed editing the task, then the system continues at block 350, else the system loops to block 330 to allow the user to continue editing the task. When the user complete editing the task and moves on to another task, the client determines if the fields changed by the last set of user actions require calculations. Modifications of some fields, like Task Name, do not require calculations as they are for display purposes only. In block 350, the system sends the user's edits to the server. If calculations are needed, the client will batch up relevant data, including: 1) properties of the edited task, 2) properties of any summary tasks that the edited task belongs to, and 3) the sequenced change log. The system sends the batch in a synchronous post to the web application tier in the background for further data validation and node consistency calculations.

In decision block 360, if there are any server responses to previous request, then the system continues at block 370, else the component continues at block 380. In block 370, the system processes the server response and updates the displayed project data. For example, the server may have rejected a change made by the user or updated other dependent tasks, and the client updates to be in harmony with the latest server data. Although steps 360 and 370 are shown in series with other steps, the client may receive responses from the server asynchronously and process them at any time.

In decision block 380, if the user continues editing the project, then the system loops to block 320 to receive the next task to edit, else the system continues at block 390. While the client is waiting for the result from the server in the background to the request sent in block 350, the user can continue to interact with the user interface and make further edits to other tasks. The client will continue to log, process, and send new user edits to the server in the manner described. Once calculation is complete at the server, the node-consistency component will return changes required for maintaining data integrity of the modified task and its related assignments. The client will apply the calculated results to the cached dataset. It will also keep a separate store of calculated changes resulting from the node consistency check. In block 390, the system receives a request from the user to check in the project. At that point, the client sends any remaining changes to the server and the server schedules the entire project and saves the changes.

Figure 4:
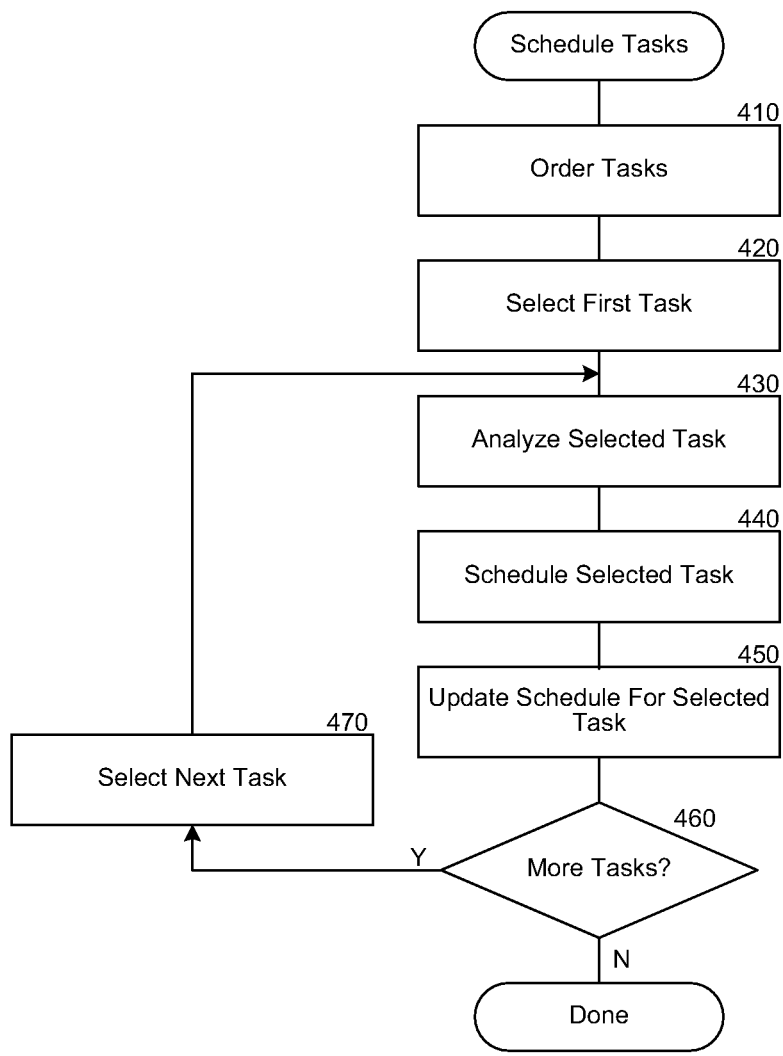
FIG. 4 is a flow diagram that illustrates the processing of a schedule engine component, in one embodiment.

FIG. 4 is a flow diagram that illustrates the processing of the schedule engine component, in one embodiment. In block 410, the component orders tasks for scheduling. Ordering the tasks for scheduling may involve placing predecessor tasks earlier in the order than successor tasks, which may cause scheduling to be performed for predecessor tasks before successor tasks. In block 420, the component selects the first of the ordered tasks. In blocks 430-450, the component determines a schedule for the tasks. In block 420, the component selects the first task to schedule. In block 430, the component analyzes the selected task, which may include, e.g., determining which of a set (or subset) of considerations for the selected task is a driver for the task. As an example, a predecessor task that ends last may be a driver for a successor task that has a finish-to-start dependency on the predecessor task.

In block 440, the component schedules the task. The component may call a subroutine of the scheduling engine component or an altogether different component to determine the schedule for the task. In block 450, the component updates schedule information for the selected task. For example, the component may update the start date of a task or the resources used based on the schedule. In block 40, the component may store the schedule determined in a data structure associated with the task. In block 460, the component determines whether there are additional tasks to analyze. If there are additional tasks, the component continues at block 470. Otherwise, the component completes the scheduling process. In block 470, the component selects the next task and then continues at block 430. By performing these steps, the scheduling engine component determines a schedule for each task of a project.

Figure 5:
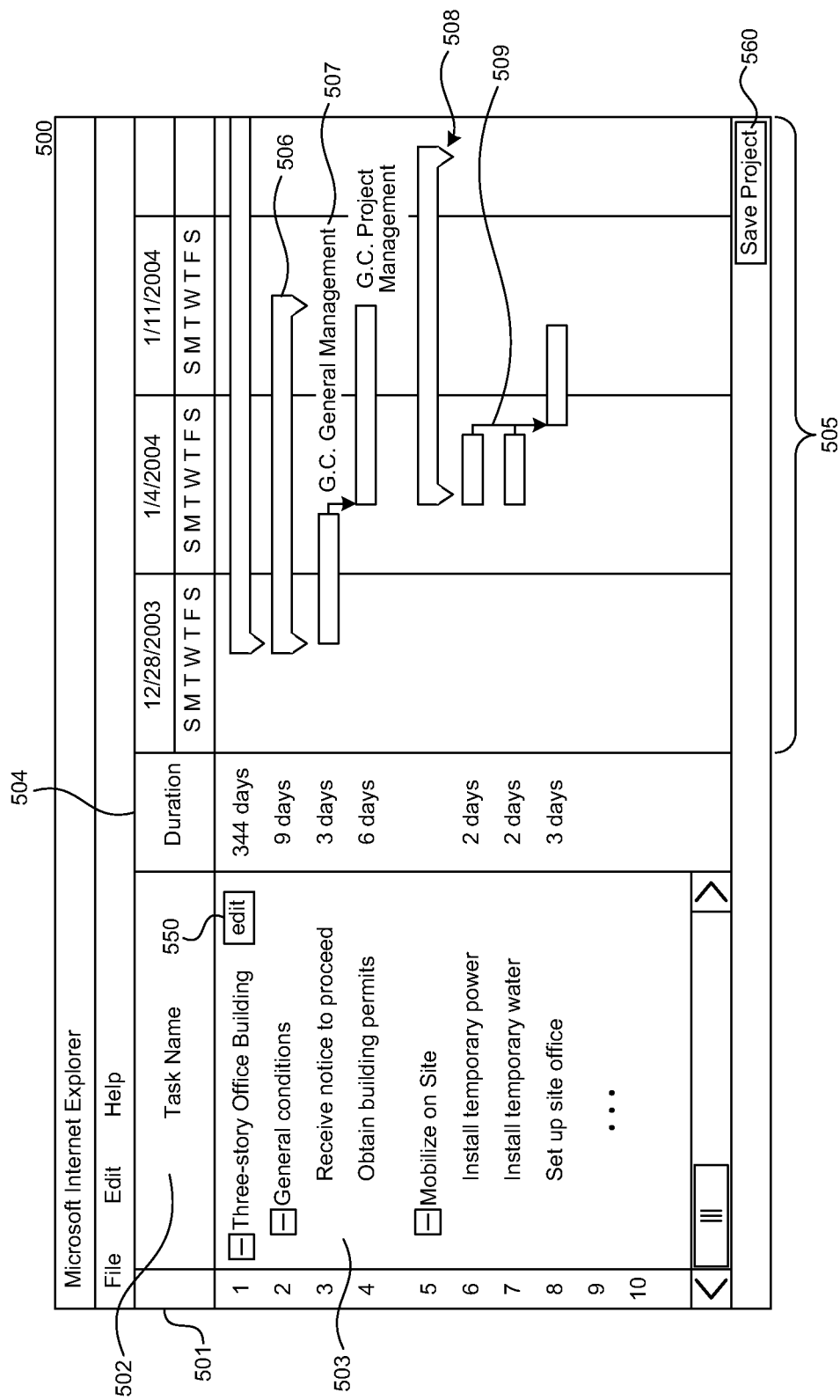
FIG. 5 illustrates a display page produced by a user interface component of the dynamic client system, in one embodiment.

FIG. 5 illustrates a display page produced by the user interface component of the dynamic client system, in one embodiment. The display page 500 may display project management software in a web browser, such as Microsoft Internet Explorer. The display page 500 comprises a textual area for textually displaying and receiving information, and a graphical area for graphically displaying and receiving information. As an example, the textual area may display information relating to tasks such as a task number 501, a task name 502, and a task duration 504. As a further example, the graphical area may display information relating to tasks and their schedule as a Gantt chart 505. The textual area and the graphical area may together be referred to as a project plan window.

A user may be able to input information directly into the textual area by selecting a row, e.g., row 503 corresponding to task number 3, and typing information or performing other user interface operations in a manner generally similar to that which would be performed when using spreadsheet software. As examples, the user may be able to type a name or description for a task, a duration for the task, and indicate that the task is a subtask of a summary task 506. The display page 500 may also provide an edit button 550 for a user to explicitly indicate intent to edit a task.

Each task may have one or more resources assigned to the task. These resources may be displayed in the Gantt chart adjacent to the bar for the task, such as resource 507. In the illustrated example, a "G.C. general management" resource is assigned to task number 3. Tasks may be linked with one another to indicate time-related dependencies. As an example, a successor task may only begin after a predecessor task is completed. This relationship between predecessor and successor tasks may be referred to as a dependency. A dependency that causes a successor task to begin after a predecessor task ends is referred to as a finish-to-start dependency. When tasks have a time-related dependency (e.g., a finish-to-start or other dependency), the project management software may indicate the dependency on the Gantt chart using an arrow, such as arrow 509. Other time-related dependencies include, e.g., start-to-start, finish-to-finish, and start-to-finish (not shown). A start-to-start dependency may be used when two tasks start at the same time; a finish-to-finish dependency may be used when two tasks finish at the same time; and a start-to-finish dependency may be used when the start date of a predecessor task determines the finish date of a successor task.

The user may be able to set or modify schedule information relating to a task (e.g., a constraint or dependency) using bars of the Gantt chart. As an example, the user may drag a left or right boundary of the bar 508 to change the associated task's start date or end date. As a further example, the user may be able to drag and drop the bar to indicate that the task is a sub-task of a summary task (e.g., by moving the bar's position vertically) or change the task's schedule (e.g., by moving the bar's position horizontally). When the user finishes editing the project, the user can press the save project button 560, to check in the project and prompt the server to calculate the schedule for the project based on all of the user's changes.

Figure 6:
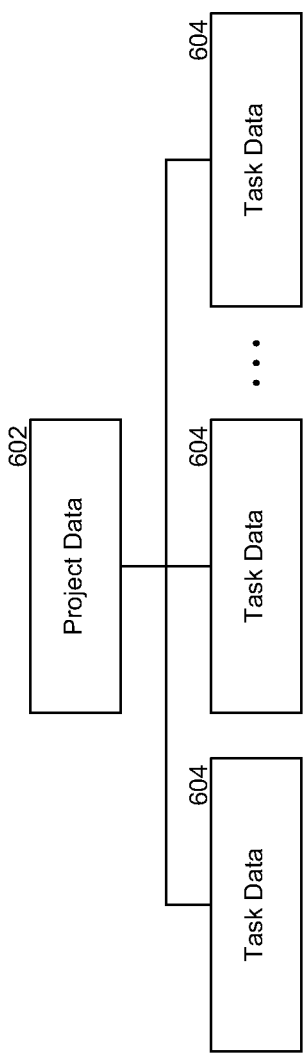
FIG. 6 is a block diagram illustrating an embodiment of a data structure relating to a project and its tasks.
Figure 7:
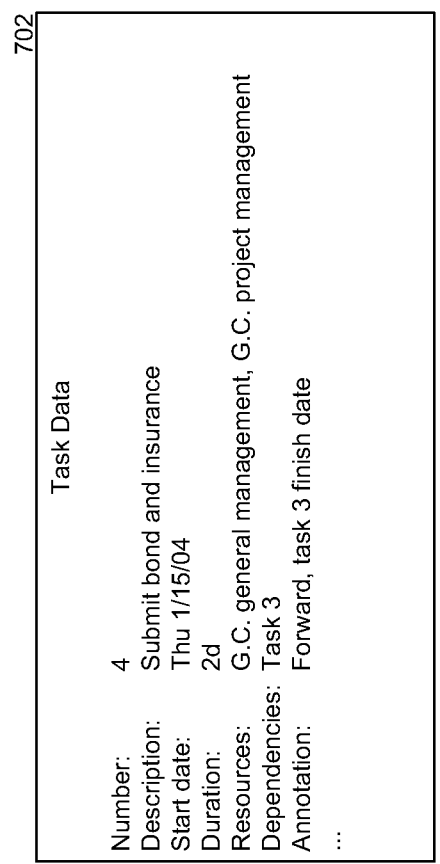
FIG. 7 is a block diagram illustrating an embodiment of a data structure relating to a task.

FIGS. 6-7 illustrate data structures associated with projects and tasks. The data structures may store data provided by a user using a user interface of the project management software, or other software using an API exposed by the project management software, and may store data or other information produced or determined by the project management software. The data structures may be stored in primary or secondary storage.

FIG. 6 is a block diagram illustrating an embodiment of a data structure relating to a project and its tasks. Each project may have project-related data stored in a data structure associated with the project 602. As examples, project-related data may include a project name, a project start date, and project holidays. Project-related data may also include an indication of a number of tasks and their associated task-related data structures 604. Each task-related data structure comprises input data or other information relating to a task (further described below in relation to FIG. 7).

FIG. 7 is a block diagram illustrating an embodiment of a data structure relating to a task. The task data structure 702 may comprise input data and other information associated with a task. As examples, task-related data may include, e.g., a task number, description, start date, duration, resources assigned to the task, dependencies or constraints, and an annotation or explanation relating to the task's schedule. The task-related data may also comprise additional information (not shown). There may be a one-to-one correspondence between the number of task data structures and the number of tasks associated with the project. In the illustrated embodiment, the task data structure 702 is shown containing data corresponding to task number 4. There may be additional task data structures for each of the other tasks in the project (not shown).

In some embodiments, the dynamic client system batches changes to a task to reduce the network bandwidth the system uses between the client and project server. When a user checks out a project for editing, the client stores the project's task-level data in a client-side cache. To reduce the number of requests the client sends to the server, when a user makes multiple edits to the same task, the client batches the changes and sends the changes to the server when the user has completed editing that task (i.e. when users move on to editing another task).

In some embodiments, the dynamic client system sends only information about tasks that have changed to the server. To reduce the amount of data transmitted over the network, after users make an edit to a task, the client will pre-process the request and send only a subset of project data to the project server. The subset contains the edited task's data along with its summary tasks as identified by the client (since summary tasks contain rollup values of all its subtasks, changing a subtask will affect summary task's values).

In some embodiments, the dynamic client system stores a sequence of user edits on the client. For example, if a user edits a task start date, then finish date, then name, then the system stores each edit sequentially in the client change log. This prevents inconsistencies at the client, such as a user deleting a task and then changing the tasks name. The client displays the edits as if the changes have been made to the project, but the changes may not be made until the user selects another task or closes the project. However, even before the changes are saved, the system provides a consistent appearance to the project so that the user is not able to perform editing operations that the project server would not allow if the user were directly editing the project.

In some embodiments, the dynamic client system sends deltas of edits to the server. The server may track the state of conversations with the client, such that the server knows what information the client has previously sent. Thus, if the client edits a first task, and submits that change to the server, then the client does not resend the first change when the client changes a second task, because the server already has the first change. This reduces the amount of information that the client sends to the server. Similarly, the server's replies may also include only the information that has changed since the server last replied to the client, because the client updates its cache based on each reply. When the client finishes editing the project, the client may resend all changes to the server for the final saving of the project, or the server may use the cached state information at the server to apply the changes previously received from the client to the project store.

In some embodiments, the dynamic client system does not send all project data from the server to the client based on security considerations. For example, a client may not have access to some project data, and thus the server may not send that data to the client. When the user of the client edits the project, the server may resolve inconsistencies with project data not provided to the client and send the client an update to any information that the client can view related to resolve the inconsistencies.

In some embodiments, the dynamic client system allows multiple users to edit the project at the same time. When a client sends changes to the server, the server may reply with information related to the outcome of consistency checks of the client's own changes as well as changes received from other clients. In this way, each client has a lightweight editing experience, but still receives up to date project information provided by other users.

From the foregoing, it will be appreciated that specific embodiments of the dynamic client system have been described herein for purposes of illustration, but that various modifications may be made without deviating from the spirit and scope of the invention. For example, although a project planning application has been described by way of example, many other types of applications can use the techniques described herein to provide a richer, web-based user experience. As one example, video games could use the system described because the server of an online game often maintains a consistent state which clients send various updates and continue other processing. Accordingly, the invention is not limited except as by the appended claims.

We claim:

1. A computer-implemented method for editing a project on a synchronous project server via an asynchronous client, the computer-implemented method comprising:

receiving, at the asynchronous client, a first edit to a first project task of the project made by a user of the asynchronous client;

receiving, at the asynchronous client, an indication that the user of the asynchronous client has completed editing the first project task;

sending, from the asynchronous client to the synchronous project server, the first edit to the first project task via background processing while the user of the asynchronous client continues to interact with the project, wherein the asynchronous client is configured to receive a completion response from the synchronous project server for each edit sent to the synchronous project server after processing at the synchronous project server of each edit is complete;

receiving, at the asynchronous client from the synchronous project server, a confirmation response indicating that the synchronous project server received the first edit to the first project task;

receiving, at the asynchronous client, a second edit to a second project task of the project made by the user of the asynchronous client while the asynchronous client is waiting for a completion response for the first edit to the first project task indicating that the synchronous project server has processed the first edit to the first project task;

sending, from the asynchronous client to the synchronous project server, the second edit to the second project task via background processing, wherein the user of the asynchronous client can continue editing the project without waiting for the synchronous project server to finish processing each edit sent to the synchronous project server; and receiving, at the asynchronous client from the synchronous project server, a completion response for each edit sent to the synchronous project server after processing of each edit by the synchronous project server is complete.

2. The computer-implemented method of claim 1, wherein the completion response for the first edit to the first project task includes an acknowledgement that the first edit to the first project task was successfully applied to the project.

3. The computer-implemented method of claim 1, further comprising:
upon receiving the completion response for the first edit to the first project task from the synchronous project server, refreshing a display of the project at the asynchronous client based on the completion response for the first edit to the first project task.

4. The computer-implemented method of claim 1, further comprising:
checking in the project; and
receiving project information from the synchronous project server, wherein the project information includes edits made by another user.

5. The computer-implemented method of claim 1, wherein the completion response for the first edit to the first project task includes an update to the first project task based on a consistency check performed by the synchronous project server.

6. The computer-implemented method of claim 1, wherein a type of the first edit to the first project task is one of:
changing a project name, changing a project start date, changing a project end date, changing a project duration, or changing a dependency of the project.

7. The computer-implemented method of claim 1, wherein the asynchronous client batches changes to the first task together and sends the changes to the synchronous project server when the user begins editing the second project task.

8. The computer-implemented method of claim 1, wherein sending the first edit to the first project task comprises sending a delta of information about the first project task that has changed since a previous send to the synchronous project server.

9. A computing device comprising:
a processor configured to execute computer-executable instructions; and
memory storing computer-executable instructions that, when executed by the processor, cause the computing device to perform a method for editing a project on a synchronous project server via an asynchronous client on the computing device, the method comprising:
receiving, at the asynchronous client, a first edit to a first project task of the project made by a user of the asynchronous client;
receiving, at the asynchronous client, an indication that the user of the asynchronous client has completed editing the first project task;
sending, from the asynchronous client to the synchronous project server, the first edit to the first project task via background processing while the user of the asynchronous client continues to interact with the project, wherein the asynchronous client is configured to receive a completion response from the synchronous project server for each edit sent to the synchronous project server after processing at the synchronous project server of each edit is complete;
receiving, at the asynchronous client from the synchronous project server, a confirmation response indicating that the synchronous project server received the first edit to the first project task;
receiving, at the asynchronous client, a second edit to a second project task of the project made by the user of the asynchronous client while the asynchronous client is waiting for a completion response for the first edit to the first project task indicating that the synchronous project server has processed the first edit to the first project task;
sending, from the asynchronous client to the synchronous project server, the second edit to the second project task via background processing, wherein the user of the asynchronous client can continue editing the project without waiting for the synchronous project server to finish processing each edit sent to the synchronous project server; and
receiving, at the asynchronous client from the synchronous project server, a completion response for each edit sent to the synchronous project server after processing of each edit by the synchronous project server is complete.

10. The computing device of claim 9, wherein the completion response for the first edit to the first project task includes an acknowledgement that the first edit to the first project task was successfully applied to the project.

11. The computing device of claim 9, wherein the memory further stores computer-executable instructions for:
upon receiving the completion response for the first edit to the first project task from the synchronous project server, refreshing a display of the project at the asynchronous client based on the completion response for the first edit to the first project task.

12. The computing device of claim 9, wherein the completion response for the first edit to the first project task includes an update to the first project task based on a consistency check performed by the synchronous project server.

13. The computing device of claim 9, wherein the asynchronous client batches changes to the first task together and sends the changes to the synchronous project server when the user begins editing the second project task.

14. The computing device of claim 9, wherein sending the first edit to the first project task comprises sending a delta of information about the first project task that has changed since a previous send to the synchronous project server.

15. A computer-readable storage device storing computer-executable instructions that, when executed by a processor of a computing device, cause the computing device to perform a method for editing a project on a synchronous project server via an asynchronous client on the computing device, the method comprising:
receiving, at the asynchronous client, a first edit to a first project task of the project made by a user of the asynchronous client;
receiving, at the asynchronous client, an indication that the user of the asynchronous client has completed editing the first project task;
sending, from the asynchronous client to the synchronous project server, the first edit to the first project task via background processing while the user of the asynchronous client continues to interact with the project, wherein the asynchronous client is configured to receive a completion response from the synchronous project server for each edit sent to the synchronous project server after processing at the synchronous project server of each edit is complete;

receiving, at the asynchronous client from the synchronous project server, a confirmation response indicating that the synchronous project server received the first edit to the first project task;

receiving, at the asynchronous client, a second edit to a second project task of the project made by the user of the asynchronous client while the asynchronous client is waiting for a completion response for the first edit to the first project task indicating that the synchronous project server has processed the first edit to the first project task;

sending, from the asynchronous client to the synchronous project server, the second edit to the second project task via background processing, wherein the user of the asynchronous client can continue editing the project without waiting for the synchronous project server to finish processing each edit sent to the synchronous project server; and receiving, at the asynchronous client from the synchronous project server, a completion response for each edit sent to the synchronous project server after processing of each edit by the synchronous project server is complete.

16. The computer-readable storage device of claim 15, wherein the completion response for the first edit to the first project task includes an acknowledgement that the first edit to the first project task was successfully applied to the project.

17. The computer-readable storage device of claim 15, further storing computer-executable instructions for:

upon receiving the completion response for the first edit to the first project task from the synchronous project server, refreshing a display of the project at the asynchronous client based on the completion response for the first edit to the first project task.

18. The computer-readable storage device of claim 15, wherein the completion response for the first edit to the first project task includes an update to the first project task based on a consistency check performed by the synchronous project server.

19. The computer-readable storage device of claim 15, wherein the asynchronous client batches changes to the first task together and sends the changes to the synchronous project server when the user begins editing the second project task.

20. The computer-readable storage device of claim 15, wherein sending the first edit to the first project task comprises sending a delta of information about the first project task that has changed since a previous send to the synchronous project server.

* * * * *